N. L. WHITNEY.
Coffee Roaster.
No. 61,905. Patented Feb. 5, 1867.
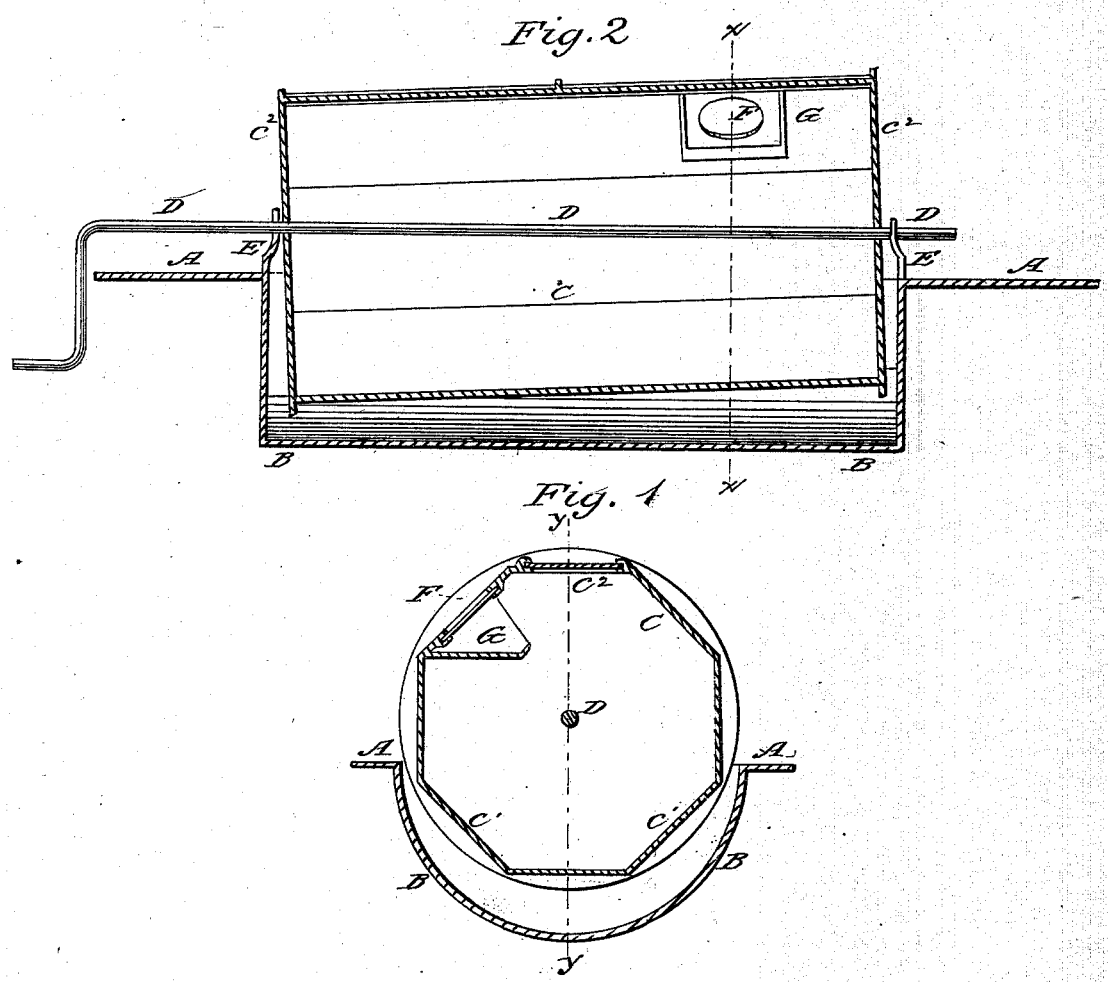

United States Patent Office.

N. L. WHITNEY, OF EFFINGHAM, ILLINOIS.

Letters Patent No. 61,905, dated February 5, 1867.

COFFEE ROASTER.

The Schedule referred to in these Letters Patent and making part of the same.

TO ALL WHOM IT MAY CONCERN:

Be it known that I, N. L. WHITNEY, of Effingham, in the county of Effingham, and State of Illinois, have invented a new and improved Device for Roasting Coffee, Corn, and other Substances; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved coffee roaster taken through the line $x\ x$, fig. 2.

Figure 2 is a vertical longitudinal section of the same, taken through the line $y\ y$, fig. 1.

Similar letters of reference indicate like parts.

My invention has for its object to furnish an improved apparatus for roasting coffee, and similar uses, which shall brown the article roasted evenly and thoroughly, and shall at the same time prevent the aromatic flavor of the coffee from being dissipated by the heat. And it consists in the combination of a polygonal cylinder, supporting tray, shaft, cup, and glass plate, whereby a complete and simple coffee roaster is made, the parts of which are constructed, arranged, and applied, as will be hereinafter more fully described.

A is the frame, which is made of various sizes to fit the tops of the various sizes of stoves in common use. B is a half drum or cylinder securely attached to the frame A, and of such a size as to set into the upper part of the stove above the fire-box, the boiler-hole covers and detachable central plate being removed. C is the polygonal roasting cylinder, the sides $c^1$ of which are planes meeting each other at an angle, as shown in fig. 1. The number of sides $c^1$ forming the cylinder is immaterial, but I prefer to make it eight-sided or octagonal in form, as giving it a better angle for throwing over and mixing the coffee. The ends $c^2$ are formed and attached in the ordinary manner. The shaft D enters one end $c^2$ of the cylinder C, at a little distance from the centre of said end, and passing longitudinally through the said cylinder passes out at the other end at a point about the same distance from the centre as the point at which it entered, but on the opposite side, as shown in fig. 2. The shaft D is supported by and revolves upon ears E attached to the frame A at the ends of the half drum B, as seen in fig. 2. By this construction and arrangement of the cylinder C and shaft D, as the said cylinder is revolved its sides carry the coffee with them up to a certain height; it is then thrown back to the lowest part of the cylinder, the kernels tumbling over each other in their descent, and becoming thoroughly mingled; the eccentric-attachment of the shaft D at the same time causing the coffee to be thrown alternately from each end towards the middle part of the cylinder, thoroughly intermingling it, and securing its being thoroughly browned or roasted through its entire mass. Through one of the sides $c^1$, is formed a hole closed by a glass plate or cover, F. Immediately below this hole or window is a cup, G, the mouth of which has an inwardly projecting edge or lip, as seen in fig. 1. This cup at each revolution of the cylinder C carries up a quantity of coffee, which can be seen through the glass F, and the progress of the roasting inspected, the lip on the mouth of the cup preventing the coffee from falling out until it has passed the window F: then it falls out and a fresh quantity is taken up. It should be observed that the cylinder C should be made wholly or nearly air-tight; this prevents the escape of the aroma of the coffee, and when the operation is completed the coffee will be found to be browned completely through, and covered with an oily moisture from the condensation of the steam driven out of the kernels by the heat.

I claim as new, and desire to secure by Letters Patent—

1. The cup G, in combination with the cylinder C, substantially as described for the purpose specified.

2. The combination and arrangement of the polygonal cylinder C, shaft D, supporting tray A B, plate F, and cup G, in the manner and for the purpose specified.

The above specification of my invention signed by me this 23d day of February, 1866.

N. L. WHITNEY.

Witnesses:
    A. B. KAGEY,
    J. C. BRADY.